(12) United States Patent
Evans et al.

(10) Patent No.: US 11,275,213 B2
(45) Date of Patent: Mar. 15, 2022

(54) METHODS OF FORMING OPTICAL FIBERS HAVING AN EXPANDED CORE FOR EVANESCENT OPTICAL COUPLING

(71) Applicant: CORNING RESEARCH & DEVELOPMENT CORPORATION, Corning, NY (US)

(72) Inventors: Alan Frank Evans, Beaver Dams, NY (US); Davide Domenico Fortusini, Painted Post, NY (US); Ming-Jun Li, Horseheads, NY (US); Aramais Robert Zakharian, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 632 days.

(21) Appl. No.: 16/176,456

(22) Filed: Oct. 31, 2018

(65) Prior Publication Data
US 2020/0132936 A1    Apr. 30, 2020

(51) Int. Cl.
*G02B 6/30*    (2006.01)
*C03B 37/022*    (2006.01)
(Continued)

(52) U.S. Cl.
CPC ............ *G02B 6/305* (2013.01); *C03B 37/022* (2013.01); *C03B 37/15* (2013.01); *C03C 25/6208* (2018.01); *C03B 2203/12* (2013.01)

(58) Field of Classification Search
CPC ...... G02B 6/30; G02B 6/4291; G02B 6/3536; G02B 6/3522; G02B 6/29331; G02B 6/29332; G02B 6/29323; G02B 6/02371
See application file for complete search history.

(56) References Cited

U.S. PATENT DOCUMENTS 5,259,059 A * 11/1993 Abramov ........... G02B 6/03622
                                                                385/123
6,542,663 B1 * 4/2003 Zhao .................. G02B 6/12007
                                                                385/15
(Continued)

FOREIGN PATENT DOCUMENTS

EP        0209998 A2 *  1/1987    ........... G02B 6/2843
EP        1247129 A1   10/2002
WO        01/51976      7/2001

OTHER PUBLICATIONS

Brusberg et al.; "Optical Couplers for Evanescent Coupling of Polymer Clad Fibers to Optical Waveguides Using Alignment Features" Filed as U.S. Appl. No. 15/884,622, filed Jan. 31, 2018; 89 Pages.
(Continued)

*Primary Examiner* — Jason L Lazorcik
(74) *Attorney, Agent, or Firm* — Michael E. Carroll, Jr.

(57) ABSTRACT

The methods disclosed herein include forming an expanded core in an optical fiber with a glass core having a core dopant and a core outer surface, and a glass cladding immediately surrounding the core and having a flat glass-portion surface closest to the core outer surface at a first core spacing $S1$. The methods include applying heat to a section of the optical fiber to cause the glass core to expand toward the flat glass-portion surface due to thermal diffusion of the core dopant. The methods also include terminating the application of heat to define the expanded core in the heated section of the optical fiber. The expanded core defines an evanescent coupling region having a second core spacing $0 \leq S2 < S1$ and an adiabatic transition region between the core and the evanescent coupling region of the expanded core.

34 Claims, 13 Drawing Sheets

(51) Int. Cl.
    *C03B 37/15*     (2006.01)
    *C03C 25/6208*     (2018.01)

(56) References Cited

U.S. PATENT DOCUMENTS

| | | | |
|---|---|---|---|
| 6,597,833 B1 * | 7/2003 | Pi | G02B 6/12007 385/24 |
| 6,625,349 B2 * | 9/2003 | Zhao | G02B 6/12007 385/15 |
| 6,952,505 B2 | 10/2005 | Aldridge et al. | |
| 9,268,096 B1 * | 2/2016 | Krasulick | G02B 6/1228 |
| 9,594,220 B1 * | 3/2017 | Sutherland | G02B 6/4206 |
| 2002/0136498 A1 | 6/2002 | Aldridge et al. | |
| 2002/0150332 A1 * | 10/2002 | Aldridge | B64D 43/00 385/31 |
| 2003/0035630 A1 * | 2/2003 | Meltz | G02B 6/2552 385/39 |
| 2003/0068119 A1 * | 4/2003 | Xie | G02B 6/29386 385/24 |
| 2003/0223672 A1 * | 12/2003 | Joyner | G02B 6/12023 385/14 |
| 2015/0316723 A1 * | 11/2015 | Taylor | G02B 6/423 385/2 |
| 2017/0205583 A1 * | 7/2017 | Bennett | G02B 6/02033 |
| 2018/0224607 A1 * | 8/2018 | Bookbinder | C03B 32/00 |
| 2019/0196104 A1 * | 6/2019 | Ghiringhelli | G02B 6/03694 |
| 2019/0235171 A1 * | 8/2019 | Brusberg | G02B 6/2852 |
| 2019/0265416 A1 * | 8/2019 | Otfried Brusberg | G02B 6/12016 |
| 2021/0072462 A1 * | 3/2021 | Gui | G02B 6/421 |

OTHER PUBLICATIONS

Kim et al.; "Characteristics of Side-Polished Thermally Expanded Core Fiber and Its Application as a Band-Edge Filter With a High Cut-Off Property"; Optics Communications, vol. 261, Issue 1, May 1, 2006, pp. 51-55.

* cited by examiner

METHODS OF FORMING OPTICAL FIBERS HAVING AN EXPANDED CORE FOR EVANESCENT OPTICAL COUPLING

FIELD

The present disclosure relates to optical fibers, and in particular relates to methods of forming optical fibers having an expanded core for evanescent optical coupling.

BACKGROUND

Optical fibers are used in a variety of optical telecommunications applications to transmit data in the form of optical signals. The optical signals can originate in a photonic integrated circuit (PIC) configured convert electrical signals to optical signals. The optical signals can also be received at a PIC configured to convert optical signals to electrical signals. A typical PIC has PIC waveguides that are optically coupled to the optical fibers, which may be part of an optical fiber cable, e.g., a ribbon jumper cable.

In some cases, the optical fibers and the PIC waveguides are optical coupled via end-to-end coupling (also called edge coupling). Such coupling requires that the end of the PIC waveguide and the end of the optical fiber be processed to achieve an optical quality (i.e., smoothly polished) surface for low-loss coupling. This type of coupling also requires that mode sizes (i.e., mode-field diameters) of the guided mode of the optical fiber and the guided mode of the PIC waveguide be closely matched, and that the respective cores of the optical fiber and the PIC waveguide be closely aligned.

An alternative approach to end-to-end coupling is to use evanescent coupling between the optical fiber and the PIC waveguide. This approach requires that the core of the optical fiber reside close to and axially along the core of the PIC waveguide over a sufficient length at a select coupling region so that the optical signals can transfer from one core to the other. To this end, specialized optical fibers have been developed where the core resides relatively close to a flat portion of the cladding that surround the core. Because such fibers can have a D-shaped cross-sectional shape, they are referred to herein as "D-shaped fibers." In a conventional D-shaped fiber, the edge of the core is spaced apart from the adjacent flat surface of the cladding by a constant distance S. A small value of S is desired to promote evanescent coupling through the flat surface at the coupling region, but a large value of S is otherwise desired outside of the coupling region to avoid losses due to the reduced waveguiding effect as well as from external influences and bending.

SUMMARY

An embodiment of the disclosure is a method of forming an expanded core in an optical fiber with a glass core having a core dopant and a core outer surface, and a glass cladding immediately surrounding the core and having a flat glass-portion surface closest to the core outer surface at a first core spacing S1. The method comprises: applying heat to a section of the optical fiber to cause the glass core to expand toward the flat glass-portion surface due to thermal diffusion of the core dopant; and terminating the applying of heat to define the expanded core in the heated section of the optical fiber, the expanded core defining an evanescent coupling region having a second core spacing $0 \leq S2 < S1$ and an adiabatic transition region between the core and the evanescent coupling region of the expanded core.

Another embodiment of the disclosure is a method of forming an expanded core in an optical fiber with a glass core and having a core dopant and a core outer surface, and a glass cladding immediately surrounding the glass core and having a flat glass-portion surface closest to the core outer surface at a first core spacing S1. The method comprises: heating the glass core at an end section of the optical fiber to cause core dopants in the core to diffuse toward the flat glass-portion surface to form an expanded core comprising an evanescent coupling region having a substantially constant diameter and an adiabatic transition region of varying diameter between the core and the evanescent coupling region; and terminating the heating to define at the evanescent coupling region a second core spacing S2, wherein $0 \leq S2 \leq (0.9) \cdot S1$.

Another embodiment of the disclosure is a method of establishing an evanescent optical coupling interface between an optical waveguide and an optical fiber with a glass core and having a core dopant and a core outer surface, and a glass cladding immediately surrounding the glass core and having a flat glass-portion surface closest to the core outer surface at a first core spacing S1. The method comprises: applying heat to a section of the optical fiber to cause the glass core to expand toward the flat glass-portion surface due to thermal diffusion of the core dopant to form an expanded core having an evanescent coupling region that defines a second core spacing $0 < S2 < S1$, wherein the expanded core comprises an adiabatic transition region between the core and the evanescent coupling region of the expanded core; and interfacing the flat glass-portion surface adjacent the evanescent coupling region with the optical waveguide to form the evanescent optical coupling interface between the optical fiber and the optical waveguide.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which.

DETAILED DESCRIPTION

Figure 1A:
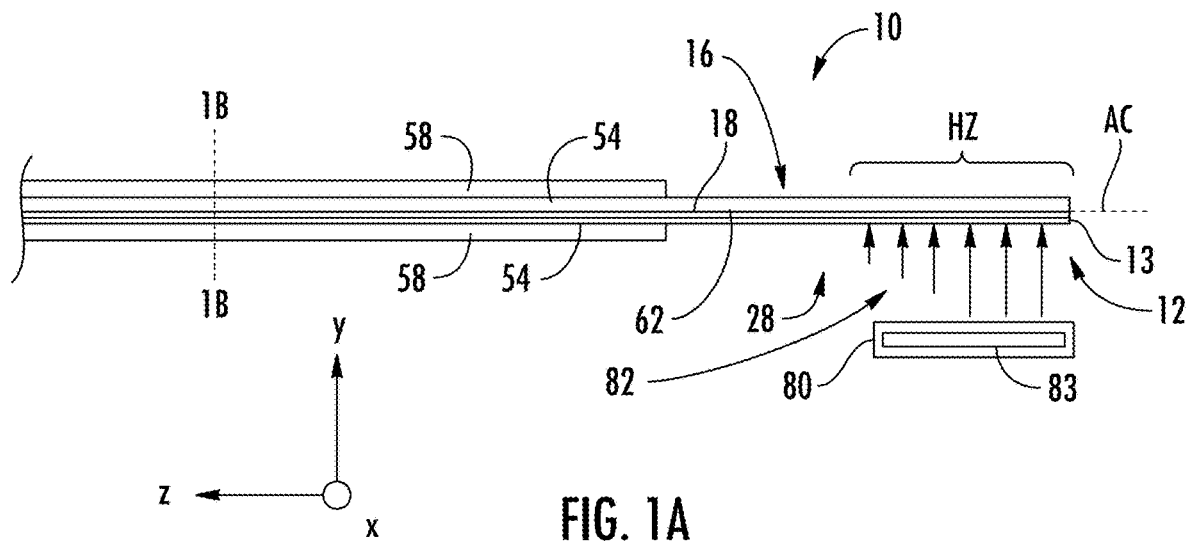
FIG. 1A is side view of an example D-shaped optical fiber used for evanescent optical coupling as disclosed herein and illustrating the application of heat to an end section of the D-shaped optical fiber to thermally expand the core.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation. The radial coordinate r is in the x-y plane.

For purposes of description herein, relative terms such as "upper," "lower," "right," "left," "rear," "front," "vertical," "horizontal," "top," "bottom," "side," and derivatives thereof, shall relate to the disclosure as oriented with respect to the Cartesian coordinates in the corresponding Figure, unless stated otherwise. However, it is to be understood that the disclosure may assume various alternative orientations, except where expressly specified to the contrary.

The term "guided mode" describes an allowed spatial distribution of light that propagates in a waveguide, whether it be an optical fiber or substrate-based PIC waveguide. A mode can have a transverse electric (TE) polarization or a transverse magnetic (TM) polarization. A single mode waveguide supports only one TE and one TM guided mode. Guided modes are identified by a mode number m, where m=0 is the fundamental mode and m=1, 2, 3, . . . are higher-order modes.

The "mode field diameter" is abbreviated MFD and a measure of the size of the fundamental (guided) mode of a fiber or waveguide. The MFD as used herein is determined by the Petermann II method as is known in the art.

The abbreviation "nm" stands for "nanometer," which is $1 \times 10^{-9}$ meter.

The abbreviation "μm" stands for "micron" or "micrometer," which is $1 \times 10^{-6}$ meter.

The term "nominal core" refers to the core of a D-shaped fiber that has not been expanded. The term "expanded core" refers to the core of a D-shaped fiber that has been expanded relative to the nominal core. The nominal core has a nominal core diameter D1 and a nominal core radius r1, while the expanded core has an expanded core diameter D2 and an expanded core radius r2. Unless otherwise noted, the term "core" refers to the nominal or unexpanded core.

The term "evanescent optical coupling interface" means a location where first and second optical waveguides are in sufficiently close proximity that a guided mode traveling in the first optical waveguide can be substantially entirely transferred to the second optical waveguide via evanescent optical coupling and travel in the second optical waveguide as a guided mode of the second optical waveguide. The evanescent optical coupling interface has a length LI and a coupling length LC, wherein LC≤LI, and wherein the coupling length LC is the length over which the evanescent coupling takes place at the evanescent optical coupling interface. In other words, the evanescent coupling need not take place over the entire length LI of the evanescent optical coupling interface but can take place over a smaller section of this interface having the coupling length LC.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "comprises" as used herein, such as in the phrase "A comprises B," is intended to include as a special case "A consists of B."

The specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting unless the claims expressly state otherwise. Additionally, embodiments depicted in the figures may not be to scale or may incorporate features of more than one embodiment.

Example D-Shaped Fiber

Figure 1B:
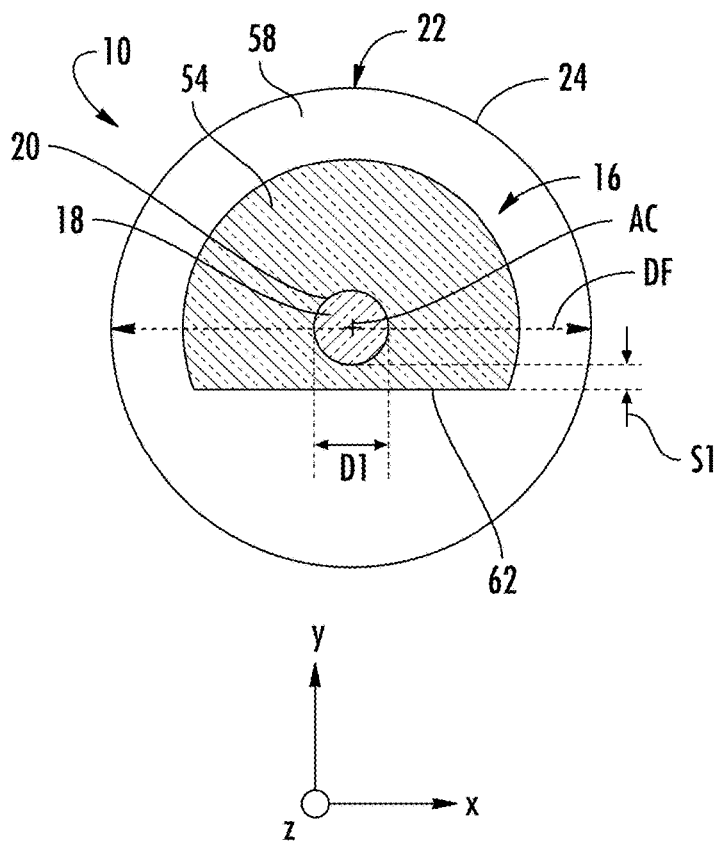
FIG. 1B is an x-y cross-sectional view of the example D-shaped optical fiber of FIG. 1A along the line 1B-1B in FIG. 1A, and showing the D-shaped cross-section defined by the flat surface on one side of the cladding.

FIG. 1A is a side view and FIG. 1B is x-y cross-sectional view of a D-shaped fiber 10, with the cross-section taken at the location 1B-1B, which is in a non-expanded location of the D-shaped fiber 10, as explained below. The D-shaped fiber 10 includes a central axis AC and has an overall diameter DF. The D-shaped fiber 10 includes a glass portion 16 defined by a glass core 18 of refractive index $n_{co}$ and a glass inner cladding 54 of refractive index $n_{cl}$, where $n_{co} > n_{cl}$. The glass core 18 is centered on the central axis AC and has an outer surface 20.

The D-shaped fiber 10 is a preferably a single mode fiber. In an example, the D-shaped fiber 10 can be a few-moded fiber, such as a fiber that is designed to support only a few guided modes. In the examples below, the D-shaped fiber 10 is assumed to be single mode unless otherwise stated.

The D-shaped fiber 10 includes an outer cladding 58 positioned around the glass portion 16 and in particular around the glass inner cladding 54. The outer cladding 58 is made of a polymer and so is referred to hereinafter as the polymeric outer cladding 58 to distinguish from the glass inner cladding 54. When discussing the glass portion 16 without the polymeric cladding 58 present, the glass inner cladding 54 is referred to as just the "cladding."

The polymeric outer cladding 58 can be composed of two parts: an inner, softer layer and an outer harder layer. The polymeric material that makes up the polymeric outer cladding 58 may include high density acrylate, low density acrylate, polyethylene, polystyrene, polymethylmethacrylate, nylon, silicone, silicone based materials, fluorinated acrylates, polyimide, ethylene tetrafluoroethylene, fluoroacrylate, fluoromethacrylate and combinations thereof. The polymeric material may be optically transparent. The polymeric outer cladding 58 may have a diameter ranging from between about 10 µm and about 900 µm, between about 80 µm and about 250 µm or between about 100 µm and 150 µm.

The glass inner cladding 54 and the polymeric outer cladding 58 cooperate to form a cladding 22 disposed around the core 18. The D-shaped fiber 10 has an outer surface 24, which can be defined either by: i) the polymeric outer cladding 58; ii) a portion of the polymeric outer cladding 58 and a portion of the glass inner cladding 54; or iii) by the glass inner cladding 54 alone.

The core 18 may be composed of pure silica, doped silica (e.g., doped with germanium, aluminum, titanium, and/or chlorine) and/or other optically transparent materials. The glass inner cladding 54 may be composed of pure silica, doped silica (e.g., fluorine, boron, and/or titanium) or other optically transparent materials.

The glass portion 16 has a glass-portion surface 62 that can be exposed when the end section 12 of the fiber 10 is processed to remove some of the polymeric outer cladding 58 to form a stripped end portion 28. The stripped end portion 28 has an axial length LS (see FIG. 2A) and the end section 12 includes an end 13. In an example, this removal process is carried out after fiber fabrication by locally ablating, etching and/or polishing down the D-shaped fiber 10. The expansion of the core 18 as discussed below occurs in the end section 12, so this section can also be referred as the expanded section, with the rest of the D-shaped fiber constituting the non-expanded section.

The glass-portion surface 62 may be flat and run parallel to the central axis AC of the fiber 10 and/or may extend coaxially with the fiber for either a portion of the fiber 10 or the entire length of the fiber. In examples, the glass inner cladding 54 along with the glass-portion surface 62 gives the fiber 10 its "D" shape, especially at the stripped end portion 28.

As best seen in FIG. 1B, in the non-expanded section of the D-shaped fiber 10, the core 18 and flat glass-portion surface 62 have a (first) core spacing S1 as measured to the closest point on the outer surface 20 of the core. The glass-portion surface 62 constitutes a surface of the glass inner cladding 54 that is closest to the core 18. In general, the core spacing S1 is in the range 2 µm ≤ S1 ≤ 4 µm.

Figure 2A:
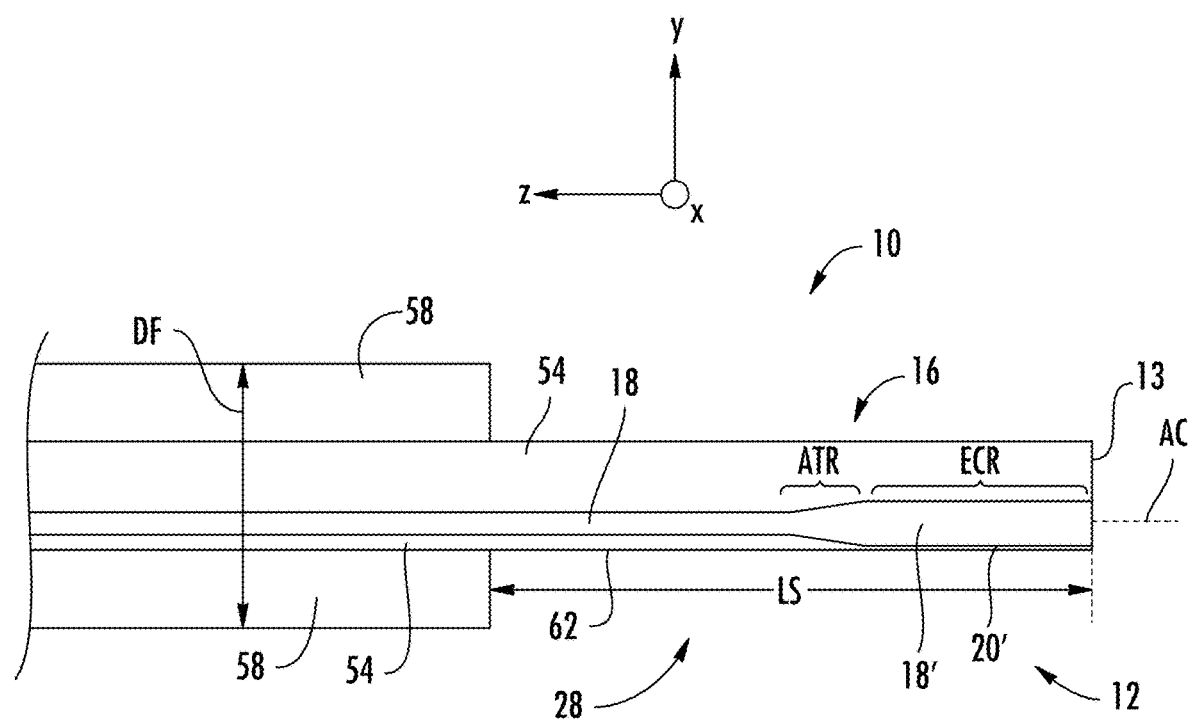
FIGS. 2A and 2B are side views of the end section of the example D-shaped optical fiber of FIG. 1A showing an example of the tapered shape of the expanded core.
Figure 2B:
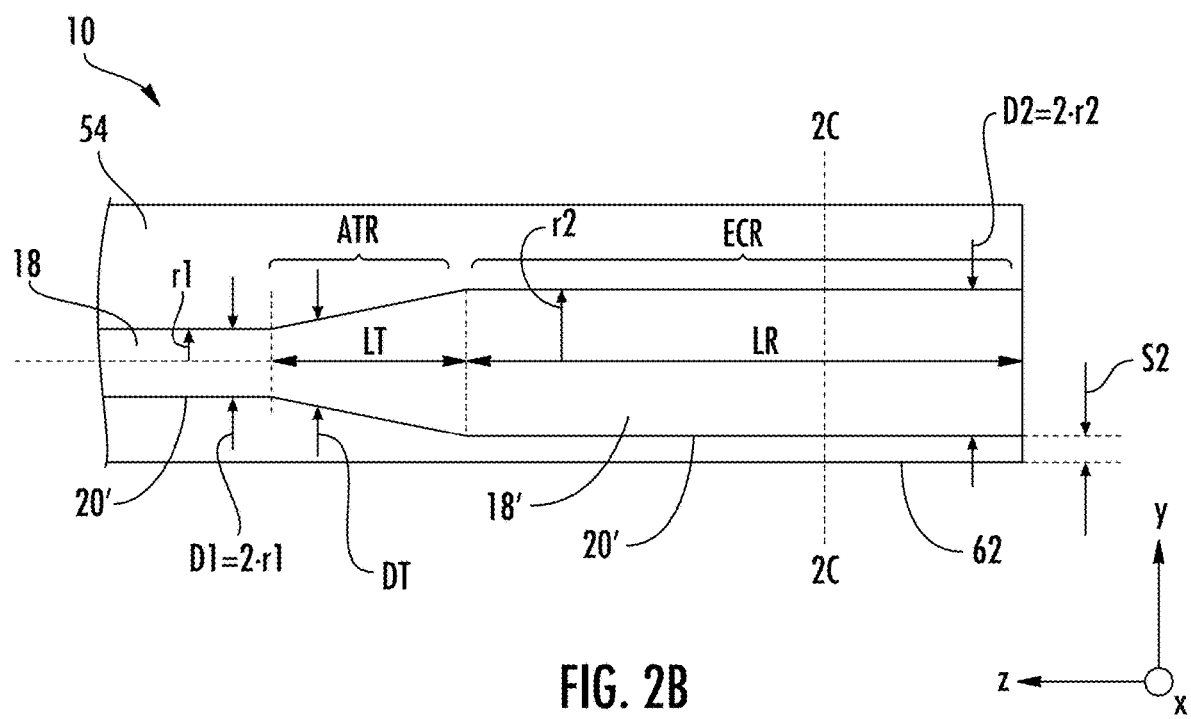
Figure 2C:
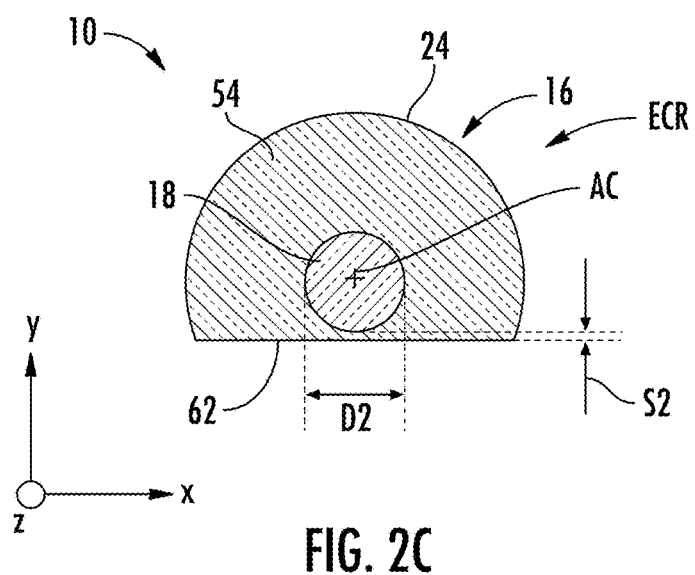
FIG. 2C is an x-y cross-sectional view similar to FIG. 1B and shows the glass portion of the D-shaped optical fiber as taken along the line 2C-2C in FIG. 2B in the evanescent coupling region of the end section of the D-shaped optical fiber.

With reference again to FIG. 1A, in an example, a portion of the core 18 in the end section 12 is heated with heat 82 within a heating zone HZ so that the radial size of the core 18 increases to define an expanded core 18' having an outer surface 20', as shown in FIG. 2A. FIG. 2B is a close-up view of the end section 12 showing the expanded core 18' having an outer surface 20' while FIG. 2C is an x-y cross-sectional view taken in the end section 12 at the line 2C-2C. The expanded core 18' in the expanded core section defines a (second) core spacing S2 wherein S2<S1, or S2≤(0.9)·S1, or S2≤(0.8)·S1, or S2≤(0.75)·S1. In examples, 0 µm ≤ S2 ≤ 4 µm or 0 µm < S2 ≤ 4 µm subject to one of the above conditions on S2 and S1. Note that the condition S2=0 has the expanded core 18' reaching the flat glass-portion 62.

With reference to FIG. 2B, the expanded core 18' has a tapered adiabatic transition region ATR with an axial length LT and a varying diameter DT, and an evanescent coupling region ECR of axial length LR and a substantially constant diameter D2=2·r2 that defines the second core spacing S2. Thus, in an example, the expanded core 18' has a tapered shape. In an example, the axial length LR of the evanescent coupling region is in the range 0.5 mm ≤ LR ≤ 5 mm and the axial length LT of the adiabatic transition region ATR is in the range 0.1 mm ≤ LT ≤ 10 mm.

In an example, the core 18 includes core dopants and the expanded core 18' can be made by thermal diffusion of the core dopants. In example, the cladding 54 includes cladding dopants, and the formation of the expanded core 18' includes diffusion of the cladding dopants.

Figure 3A:
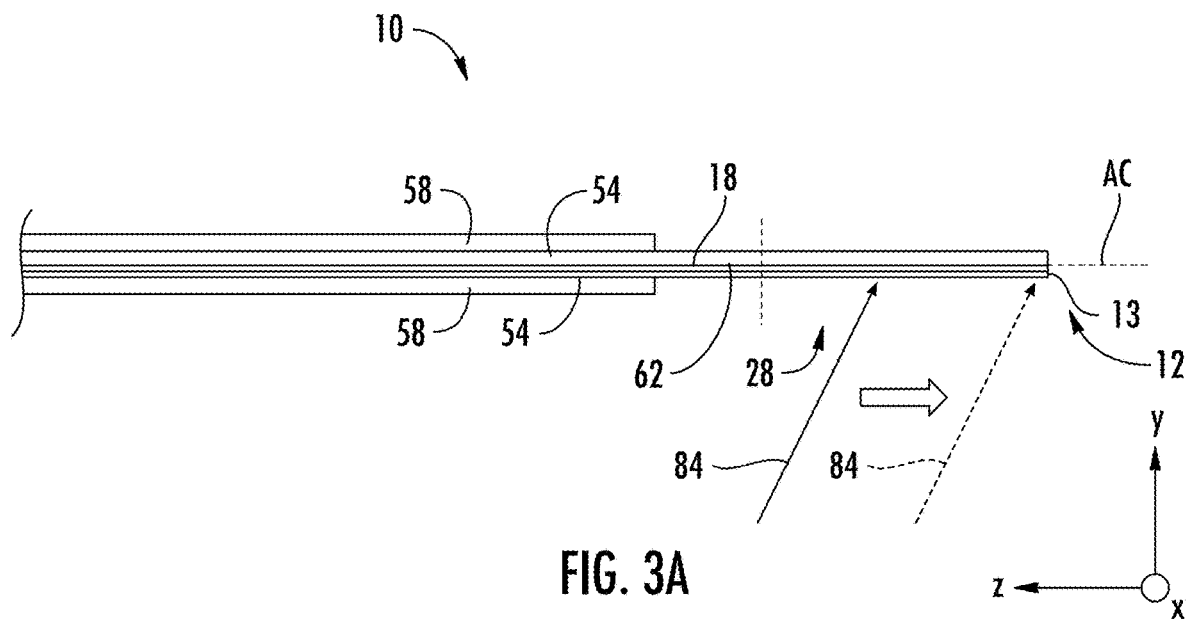
FIG. 3A is a side view of the end section of the D-shaped optical fiber illustrating an example of how a laser beam can be used for selective heating of the end section to define the tapered shape of the expanded core.

As illustrated in FIG. 1A, in an example the D-shaped fiber 10 is heated at the end section 12 with a heating unit 80 that generates the heat 82 at the heating zone HZ. The heating unit 80 can comprises one or more heating elements 83 in the form of an electric resistant coil, a gas burner, or a laser source. In the example of a laser-source heating element 83, the heat 82 takes the form of or is replaced by laser beam 84 capable of heating the D-shaped fiber 10 by irradiating the D-shaped fiber, and which in example can be scanned relative to the D-shaped fiber, as shown in FIG. 3A. In an example, the laser beam 84 can have an infrared (IR) wavelength so that it directly constitutes heat 82. In another example, the laser beam 84 can have a non-IR wavelength but have sufficient intensity to be absorbed by the D-shaped fiber to provide sufficient heating 82 to form the expanded core 18'. Thus, in the discussion herein, reference to the application of heat 82 from the heating unit 80 includes heat delivered by the laser beam 84.

Figure 3B:
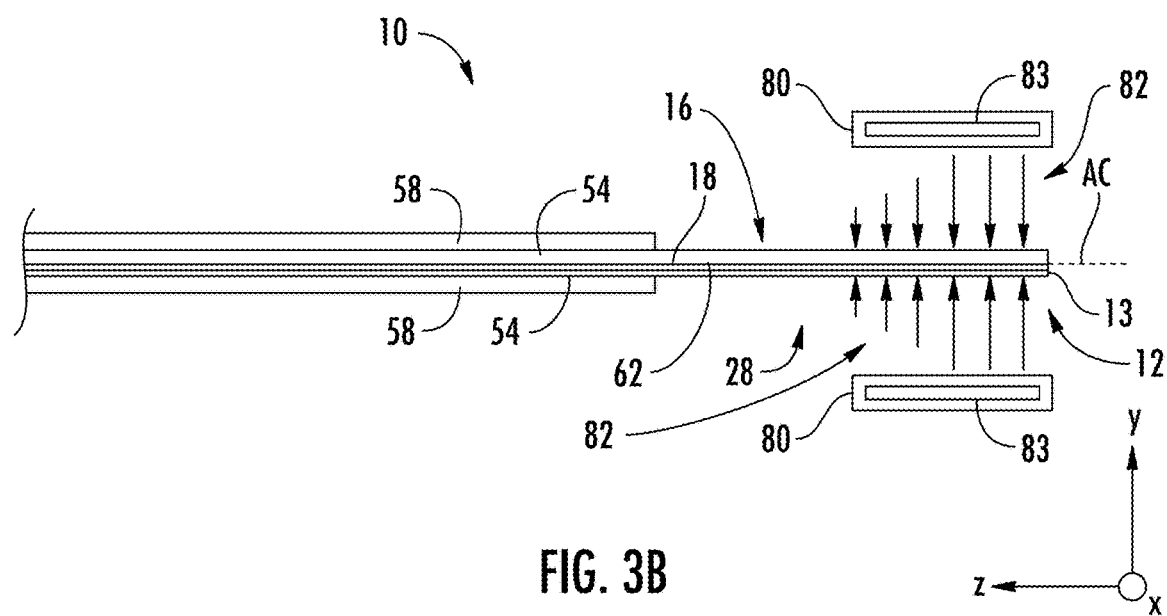
FIG. 3B is similar to FIG. 3A and illustrates an example of the application of heat to the end section of the D-shaped optical fiber from different directions to define the tapered shape of the expanded core.

In some embodiments such as shown in FIG. 3B, the heat source 80 is configured to heat the end section 12 of the D-shaped fiber 10 from different directions, including in one example a substantially even distribution around the D-shaped fiber to create a radially symmetric diffusion profile. In some other embodiments, the heat 82 provided by the heating unit 80 is directed to the core 18 through the flat glass-portion surface 62 only, so that the dopant diffusion takes place more from the core 18 towards the flat glass-portion surface. In an example, the heat 82 is applied in a manner that varies axially along at least a portion of the end section 12 to provide the expanded core 18' with a tapered axial profile. In other words, the end section 12 is heated to a desired temperature and with a desired temperature profile.

In an example, the temperature of the end section 12 of the D-shaped fiber 10 is raised to be in the range from 1000° C. to 2200° C. In some embodiments, the temperature of the end section 12 is kept below the cladding glass softening point to avoid substantial deformation of the glass-section 16 of the fiber 10 other than the core expansion.

In an example, the end section 12 of the D-shaped fiber 10 can be moved through the heating zone HZ with a speed profile that controls the amount of dopant diffusion along the length of the D-shaped fiber in the end section 12. Alternatively, in another example the D-shaped fiber 10 can stay stationary and the heating unit 80 moves relative to the D-shaped fiber so that that the heating zone HZ moves. In another embodiment, the heating zone HZ and the D-shaped fiber 10 remain stationary relative to one another.

In some other embodiments, the temperature of the end section 12 of the D-shaped fiber 10 is made higher than the cladding softening point. In these embodiments, the heat exposure time is relatively brief (e.g., less than 2 minutes) to avoid significant deformation to the D-shaped fiber 10 other than the core expansion.

The application of heat 82 from the heating unit 80 is terminated at a select time to define a select core spacing D2 as well as select or minimum amount of taper for the adiabatic transition region ATR.

In an example, it may be desirable to form the D-shaped fiber 10 using core dopants in the core 18 that can diffuse relatively fast to reduce the process time for forming the expanded core 18'. A Ge dopant is used as the core dopant in most single mode fibers and this dopant can diffuse when the fiber is heated. The thermal diffusion rate of Ge is relatively slow, which provides optical fibers doped with Ge with certain advantages when subjected to high-temperature environments. On the other hand, it will take relatively long time to form the expanded core 18' because the relatively slow thermal diffusion rate. To increase the thermal diffusion rate, the core dopant can be chlorine (Cl) because Cl can diffuse faster than Ge. Thus, in an example, the (nominal) core 18 and expanded core 18' comprise chlorine-doped silica. The inner glass cladding 54 can be made of pure silica or fluorine-doped silica.

Example Application

Figure 4A:
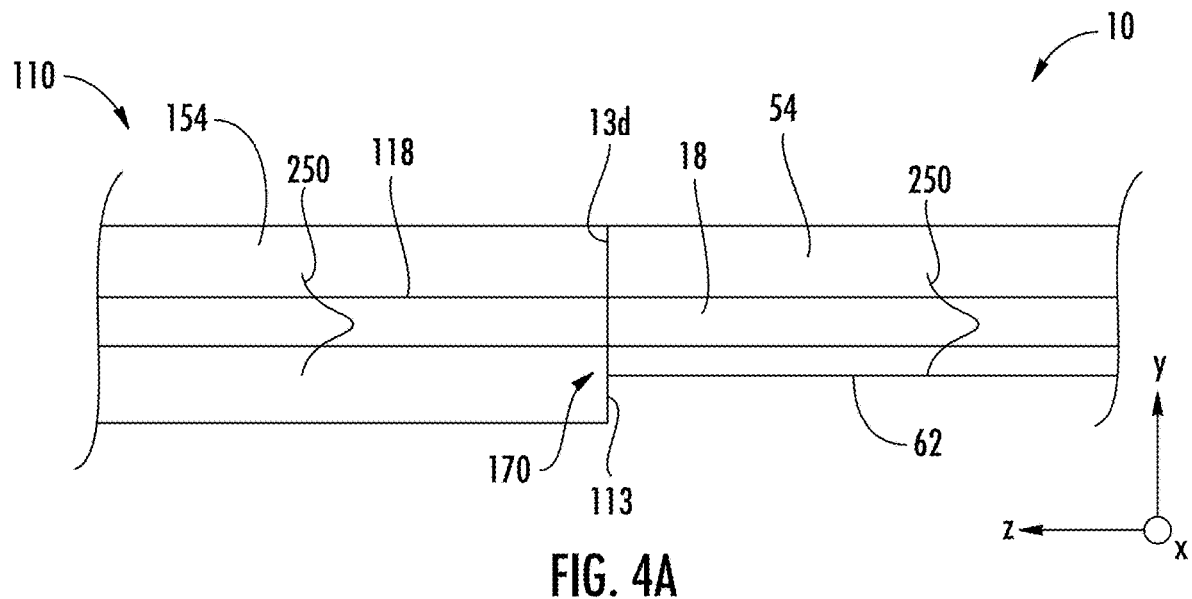
FIG. 4A is a close-up side view of a standard single mode fiber end-to-end coupled to one end of the D-shaped fiber where the core of the D-shaped fiber is not expanded and so substantially matches that of the standard single mode fiber.
Figure 4B:
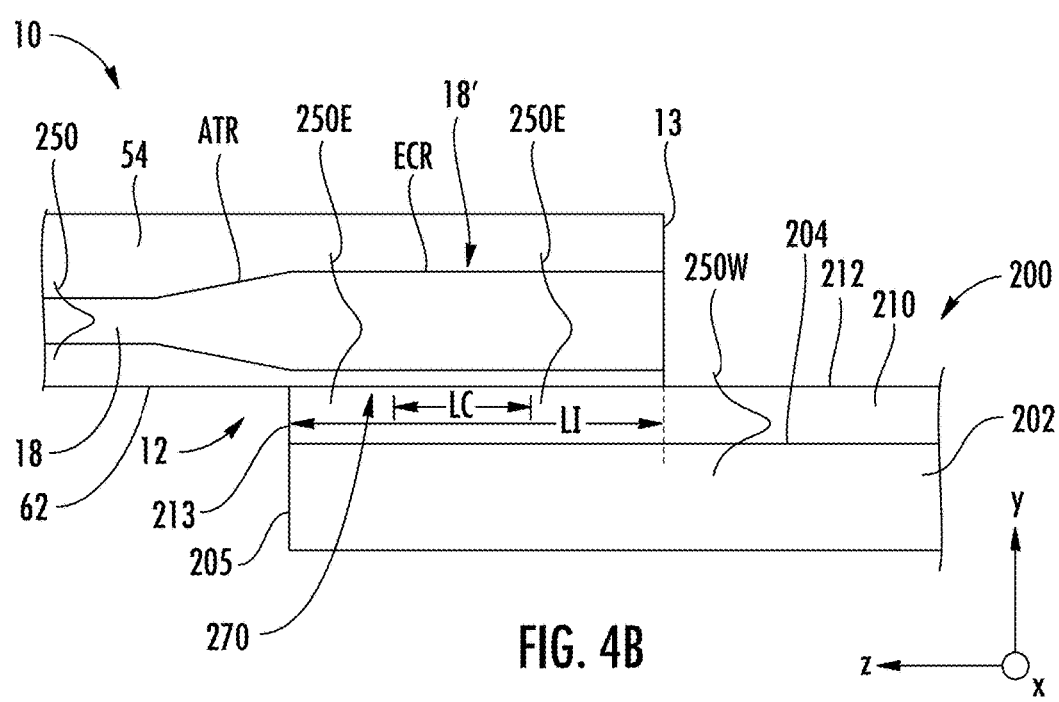
FIG. 4B is a close-up side view of the end section of the D-shaped optical fiber with the expanded core operably disposed relative to a PIC waveguide of a PIC and illustrating the evanescent coupling of a guided mode traveling in the expanded core to the PIC waveguide.
Figure 4C:
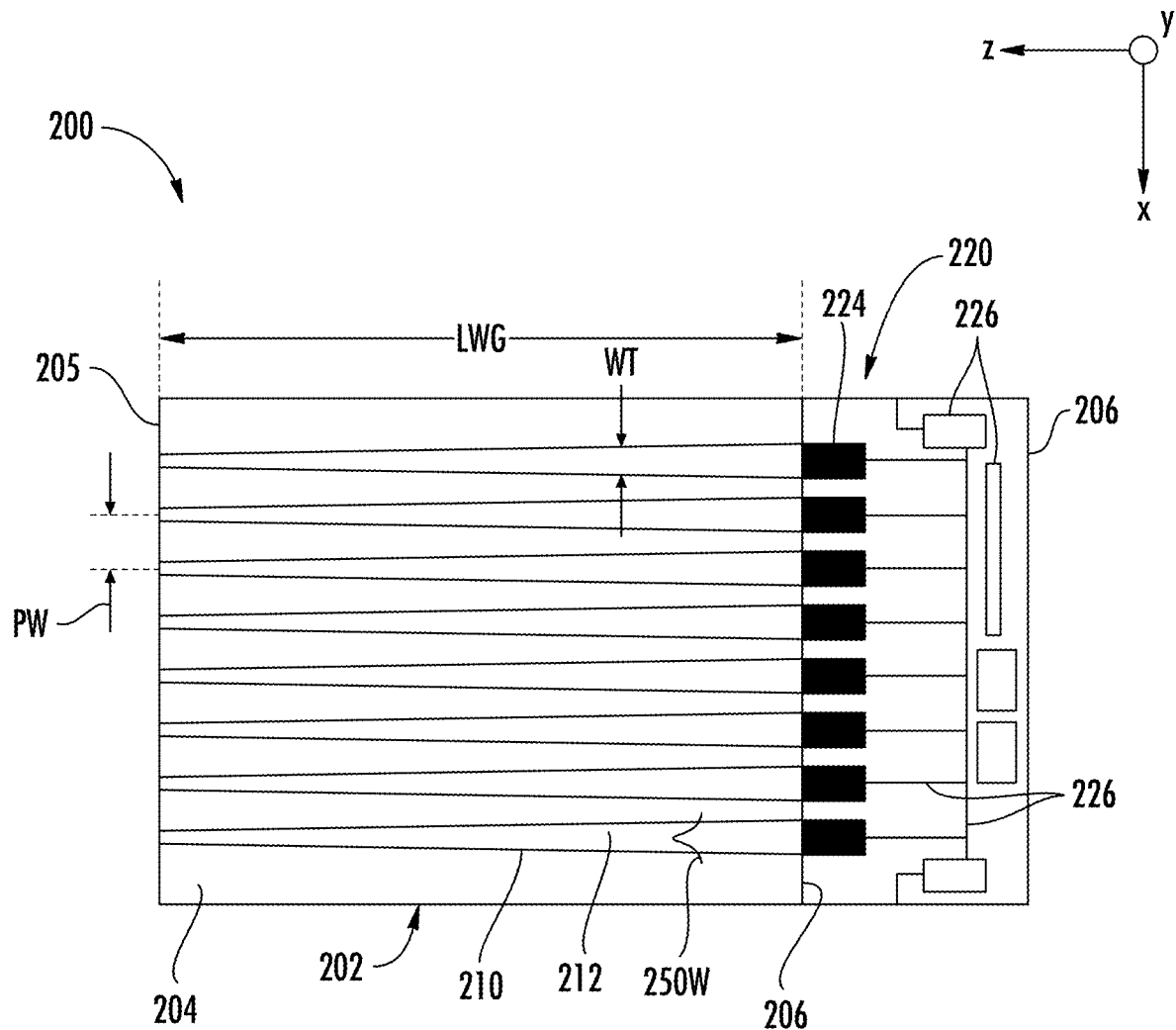
FIG. 4C is a top-down view of an example PIC showing an array of tapered waveguides optically coupled to active components of the PIC, which are shown by way of example as supported by an optical chip.
Figure 4D:
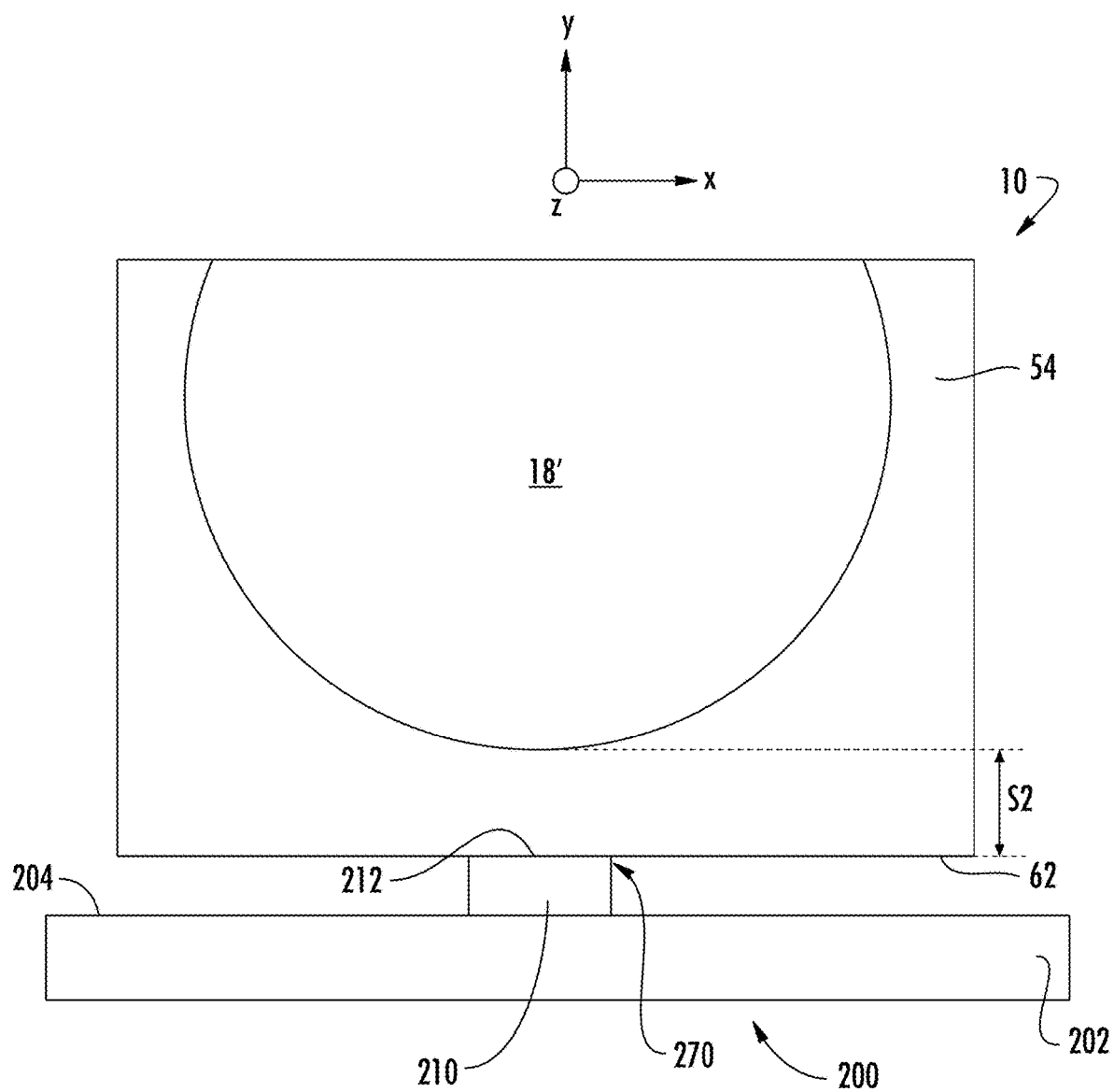
FIG. 4D is a close-up x-y cross-sectional view of an example D-shaped fiber and an example PIC having a raised channel waveguide.

FIG. 4A is a close-up side view of a distal end (or end face) 13d of the D-shaped fiber 10 opposite from (and thus remote relative to) the end section 12 that includes the (proximal) end 13. The distal end 13d of the D-shaped fiber 10 is end-to-end coupled to an end 113 of a standard single mode fiber (SMF) 110 having a core 118 and a cladding 154 surrounding the core. The contacted ends 13d and 113 define a fiber-to-fiber optical coupling interface 170. FIG. 4B is a close-up side view of the end section 12 of the same D-shaped fiber 10 of FIG. 4A operably arranged relative to a PIC 200 and in particular evanescently coupled to a PIC waveguide 210 operably supported by a PIC substrate 202 of the PIC 200. FIG. 4C is a top-down view of an example PIC 200. FIG. 4D is an example x-y close-up cross-sectional view of the D-shaped fiber 10 and the PIC 200.

The example PIC 200 includes the aforementioned PIC substrate 202, which has a top surface 204, a front end 205 and a back end 206. The PIC substrate 202 supports one or more waveguides 210 on or in the top surface 204. In the example of FIG. 4B, the waveguides 210 have a top surface 212 and have an end 213 at or near the end 205 of the PIC substrate 202.

In an example, the PIC waveguide 210 is supported on the top surface 204 of the PIC substrate 202 and terminates at the front end 205 of the PIC substrate. The PIC 200 may be further mounted onto a base substrate (not shown), such as a circuit board for example. With reference to FIG. 4A, a (fundamental) guided mode 250 of the SMF 110 is shown traveling from left to right through the fiber-to-fiber optical coupling interface 170 to travel as the guided mode 250 of the D-shaped fiber 10. In an example, the diameter of the core 118 of the SMF 110 is substantially the same as that of the diameter D1 of the core 18 so that the MFDs of the SMF and the D-shaped fiber 10 are closely matched for optimum coupling efficiency. The guided mode 250 is also referred to as a nominal guided mode since it is associated with the nominal core 18.

As best seen in FIG. 4B, the glass-portion surface 62 of the end section 12 of the D-shaped fiber 10 is interfaced with the top surface 212 of the PIC waveguide 210 of the PIC 200 to define an evanescent optical coupling interface 270. In an example, multiple D-shaped fibers 10 are so interfaced with respective PIC waveguides 210 of the PIC 200.

In an example illustrated in FIG. 4C, the PIC 200 can include an additional active optical chip 220 that includes one or more active optical components 224 capable of transmitting (e.g., using laser diodes) and/or receiving (e.g., using photodetectors) optical signals. In such embodiments, the PIC waveguides 210 and PIC substrate 202 can constitute a planar lightwave circuit (PLC) and the optical signals are passed between the one or more PIC waveguides 210 and the active optical components 224 of the active optical chip 220. In other embodiments, the active optical components 224 are provided directly on the PIC substrate 202 thereby obviating the need for an additional active optical chip. The PIC 210 may further include additional drive circuitry 226 to control the active optical components 224 to effectuate the conversion of optical signals into electrical signals and vice-versa.

The PIC 200 may be fabricated from any material capable of having PIC waveguides 210 disposed thereon or formed therein. As non-limiting examples, the PIC 200 may be fabricated from a glass-based material (e.g., glass, glass-ceramic, and fused silica) or a semiconductor material (e.g., silicon). The PIC waveguides 210 may be configured as any known or yet-to-be-developed optical waveguides. Non-limiting examples of forming the PIC waveguides 210 include thin-film deposition, photolithographic masking and etching processes, laser writing, an ion-exchange process, among others. The one or more PIC waveguides 210 may be suitably configured for the operations of the PIC 200 and are merely schematically depicted in a straight-line configuration.

In the example depicted in FIG. 4C, the PIC 200 comprises eight PIC waveguides 210 that terminate at the front end 205 of the PIC substrate 202. Any number of PIC waveguides 210 may be provided to define a select PIC waveguide pitch PW at the front end 205 in anticipation of evanescently coupling an array of expanded-core D-shaped fibers 10 to respective PIC waveguides as described above. Each PIC waveguide 210 may be configured to send and/or receive optical signals to/from active the optical components 224. In one example, the optical signals may be wavelength-multiplexed, e.g., each PIC waveguide 210 may propagate optical signals at, without limitation, four wavelengths. The optical signal that travels in a given PIC waveguide 210 is depicted as a guided mode 250W, while the optical signal that travels in the expanded core 18' of a given D-shaped fiber 10 is depicted as an expanded guided mode 250E (see FIG. 4B). The adiabatic transition region ATR allows for the nominal guided mode 250 that travels in the core 18 to transition to the expanded guided mode 250E without substantial loss.

The D-shaped fiber 10 is interfaced with the PIC 200 by bringing the flat glass-portion surface 62 of the evanescent coupling region ECR into contact or into very close proximity (e.g., via an index-matching fluid) with the top surface 212 of the PIC waveguide 210. This defines the evanescent optical coupling interface 270, which has an interface length LI that includes a coupling length LC over which evanescent coupling can occur. The coupling length LC is shown by way of example as being smaller than the interface length LI, but in an example LI=LC.

As noted above, the D-shaped fiber 10 is single mode, i.e., is configured to support only the fundamental guided mode 250 at an operating wavelength λ, which in an example can be one of the known fiber telecommunication wavelengths as noted above. Since the D-shaped fiber 10 is single mode, it has only a single effective index $N_f$ and thus a single propagation constant $\beta_f$. The effective index $N_f$ and fiber propagation constant $\beta_f$ change as the nominal guided mode 250 expands to define the expanded fundamental guided mode 250E. Generally speaking, the effective index $N_f$ in the expanded end section 12 of the D-shaped fiber 10 can fall within a range $\Delta N_f$ about a target effective index value due to fiber manufacturing variations and the imprecision of the thermal expansion process. Note that a variation in the fiber effective index $N_f$ translates into a variation in the fiber propagation constant $\beta_f$ over a corresponding range $\Delta\beta_f$.

The PIC waveguide 210 also has an effective index $N_w$ and a corresponding propagation constant $\beta_w$. For efficient evanescent coupling, the effective indices $N_f$ and $N_w$ (or equivalently, the propagation constants $\beta_f$ and $\beta_w$) of the expanded end section 12 of the D-shaped fiber 10 and the PIC waveguide 210 of the PIC 200 are substantially matched. This is difficult to achieve by trying to define a fixed or constant effective index $N_w$ or propagation constant $\beta_w$ for the PIC waveguide 210. Consequently, in an example the PIC waveguide 210 is provided with a varying effective index $N_w$ (and thus a varying propagation constant $\beta_w$) by having tapered width WT, as illustrated in the top down view of FIG. 4C. The example tapered PIC waveguides 210 have the narrow end at the front end 205 of the PIC substrate and having a wide opposite end at the back end 206. The taper can also run in the opposite direction.

The taper in the PIC waveguides 210 is sufficiently gradual so that a substantial match between the effective indices $N_f$ and $N_w$ (or propagation constants $\beta_f$ and $\beta_w$) of the expanded end section 12 of the D-shaped fiber 10 and the PIC waveguide 210 occurs over the coupling length LC, which as noted above is the length over which substantially complete transfer of the expanded fundamental guided mode 250E from D-shaped fiber 10 to a guided mode 250W of the PIC waveguide 210 occurs. Of course this process can also occur in the opposite direction through the evanescent optical coupling interface 270, e.g., by the active component 224 being activated to generate a guided mode 250W that travels in the PIC waveguide 210 toward the front end 205 of the PIC substrate and thus to the evanescent optical coupling interface 270.

In the example of FIG. 4B, the coupling length LC is shown as being smaller than interface length LI of the evanescent optical coupling interface 270, i.e., LC<LI. This configuration provides sufficient room for the matching of the effective indices $N_f$ and $N_w$ (or propagation constants $\beta_f$ and $\beta_w$) to occur, as explained above. In a more restrictive example, example, LI=LC.

The smaller core spacing S2 at the end section 12 of the D-shaped fiber 10 facilitates the evanescent coupling between the D-shaped fiber 10 and the PIC waveguide 210 without having to have substantially matching MFDs.

Figure 4E:
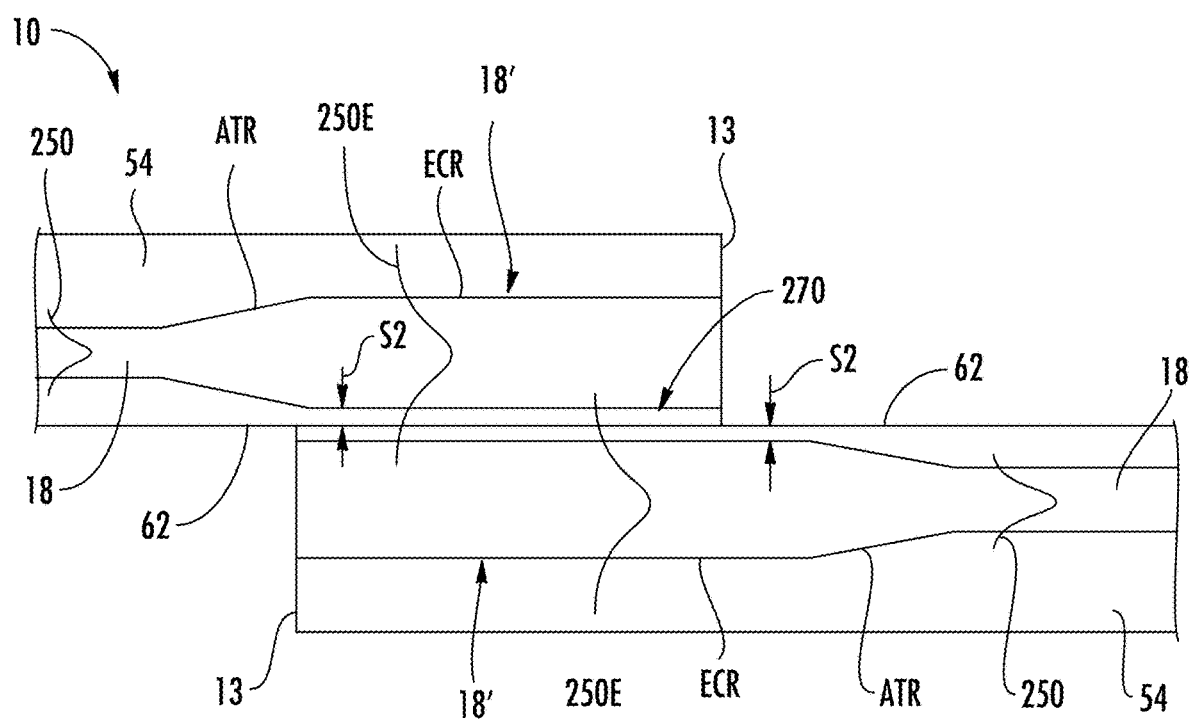
FIG. 4E is a close-up side view illustrating how two D-shaped fibers with expanded cores can be interfaced at their respective flat glass-portion surfaces to define an evanescent coupling interface that allows for evanescent coupling between the two expanded cores of the D-shaped fibers.

FIG. 4E is a close-up side view illustrating how two D-shaped fibers 10 with expanded cores 18 can be interfaced at their respective flat glass-portion surfaces 62 to define an evanescent coupling interface 270 that allows for evanescent coupling of optical signals between the two expanded cores of the D-shaped fibers. The optical signals are shown as guided modes 250 and expanded guided modes 250E traveling from left to right. Note that the total spacing between respective expanded cores 18' is given by 2·S2. In an example, the core spacings S2 for the two D-shaped fibers 10 need not be the same. In an example, the core spacing S2 of one of the D-shaped fibers 10 can be S2=0. In the example of FIG. 4E, one of the two D-shaped fibers 10 constitutes an "optical waveguide," so that the optically coupled D-shaped fibers constitute another example of a D-shaped fiber optically coupled to an optical waveguide.

Figure 5A:
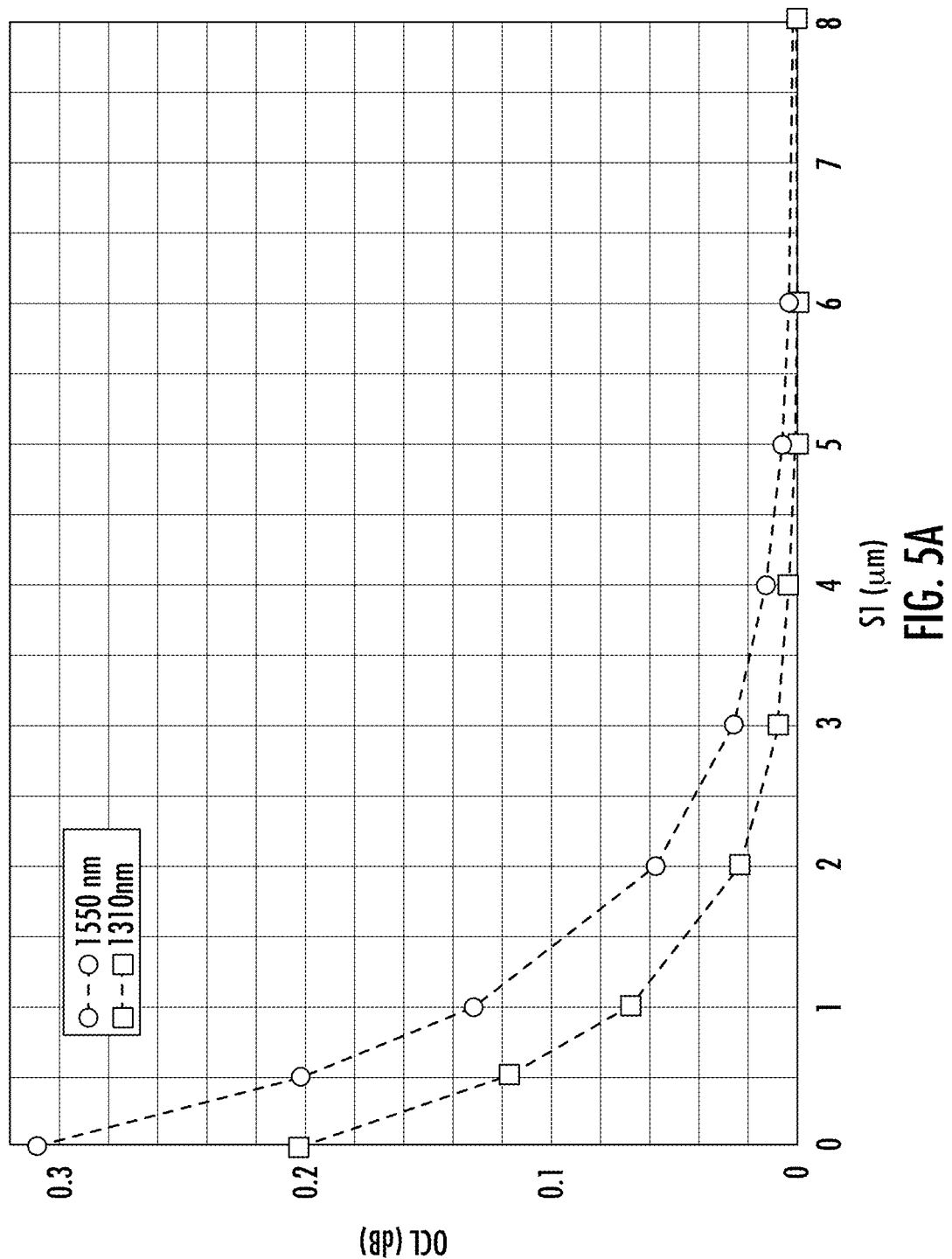
FIG. 5A is a plot of the optical coupling loss OCL (in decibels, dB) versus the core spacing S1 (microns, μm) of the non-expanded section of the D-shaped fiber for wavelengths of 1550 nm (circles) and 1310 nm (squares), illustrating the impact of the core spacing on the optical coupling loss for end-to-end coupling between a D-shaped fiber and a corresponding single mode fiber.

FIG. 5A is a plot of the modeled optical coupling loss (OCL) in decibels (dB) versus the core spacing S1 (microns, μm) of the non-expanded section of the D-shaped fiber 10 for wavelengths of 1550 nm (circles) and 1310 nm (squares) for the end-to-end coupling configuration of FIG. 4A. The computed loss in the model is due entirely to the mismatch in the MFDs of the SMF 110 and the D-shaped fiber 10. The core spacing S1 in the non-expanded section of the D-shaped fiber 10 can be optimized to reduce the optical coupling loss to the standard SMF 110. The optical coupling loss OCL of FIG. 5A was computed by assuming that the non-glass coating is stripped off both fibers, and by considering the loss due to modal mismatch only, for a nominal alignment of the respective cores 118 and 18 having the same diameter. Note that the MFDs of the two fibers will not be identical for relatively small values of S1 since the thin cladding 54 increases the strength of the optical confinement of the D-shaped fiber 10, which reduces its MFD. For a standard SMF core 118 with an MFD=9.4 μm and for S1>2 μm, the OCL from the modal mismatch between the two fibers 110 and 10 can be reduced to levels below 0.05 dB at 1310 nm. At the 1550 nm wavelength, a core spacing of S1>2.5 μm allows the optical coupling loss OCL to be below 0.05 dB.

Figure 5B:
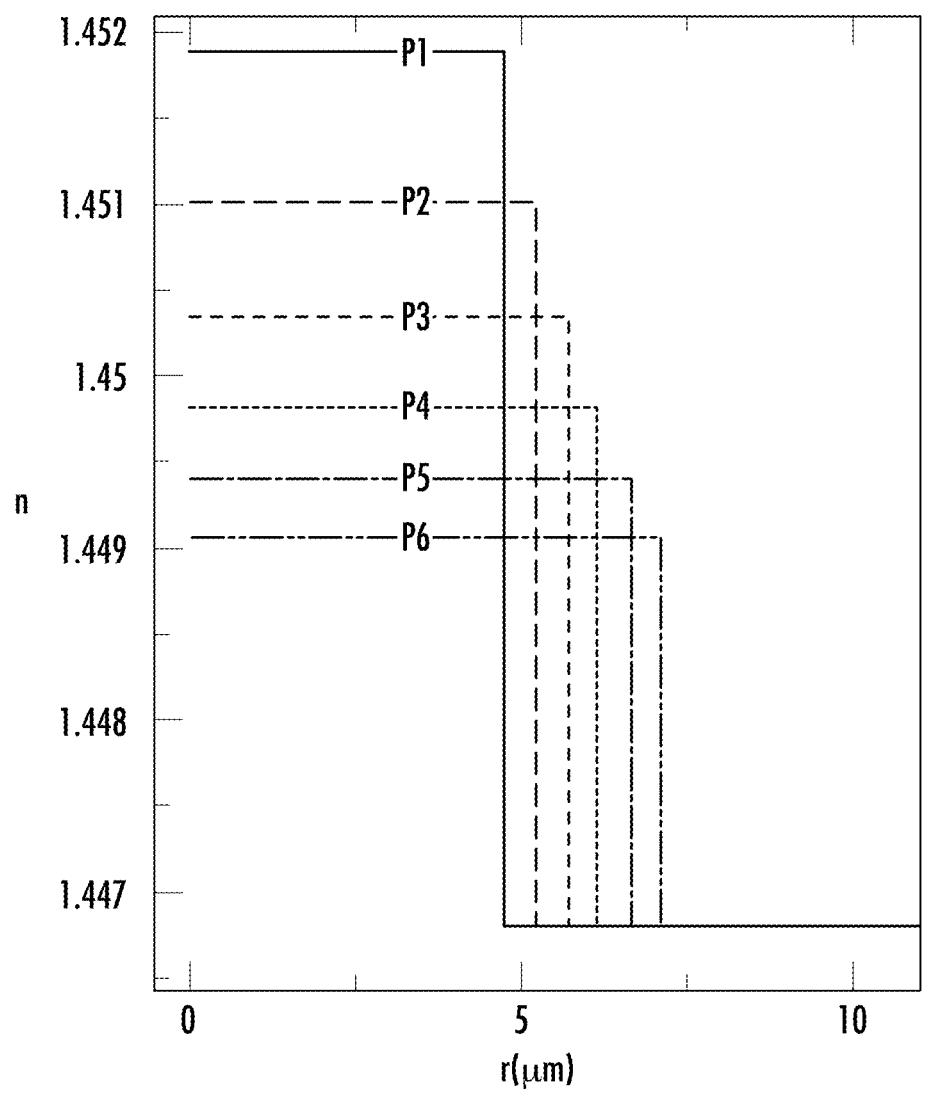
FIG. 5B is a plot of the refractive index n at a wavelength of 1310 nm as a function of the radial coordinate r (microns, μm) taken at different axial positions P1 through P6 along the adiabatic transition region of the expanded core.
Figure 5C:
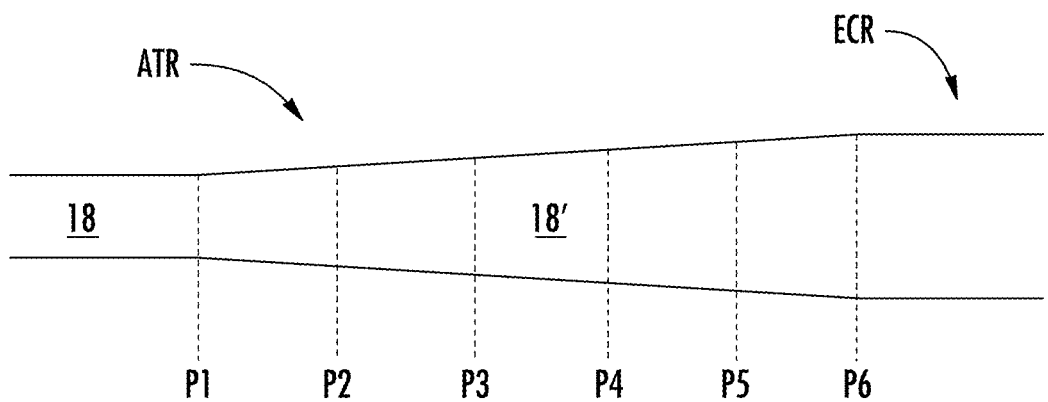
FIG. 5C is a schematic diagram of an example expanded core of a D-shaped fiber illustrating the axial positions P1 through P6 along the adiabatic transition region of the expanded core as used in the plot of FIG. 5B.

In an example, the process for forming the expanded core 18' of the D-shaped fiber 10 can be modeled based on the conservation of core dopant used to achieve the index contrast between the core 18 and the cladding 54. This modeling can be based on a step index profile without loss of generality. FIG. 5B is a plot of the refractive index n at a wavelength of 1310 nm as a function of the radial coordinate r in microns (µm) taken at different axial positions P1 through P6 along the adiabatic transition region ATR of the expanded core 18', as illustrated schematically in FIG. 5C. The conservation of core dopant results in the relationship between the expanded core radius r and the refractive index profile n(r) as shown in FIG. 5B. The positions P1 through P6 can also be thought of as different diffusion times, with the position P1 corresponding to a starting or shortest diffusion time (t=0) and P6 corresponding to the longest diffusion time (t=t6).

At 1310 nm wavelength, the MFD of the expanded guided mode 250E of the expanded core 18' increases from the nominal value of 9.4 µm at the position P1 to about 12 µm at the position P6, which represents about a 25% increase in the core radius r, i.e., r2=1.25·r1.

Figure 5D:
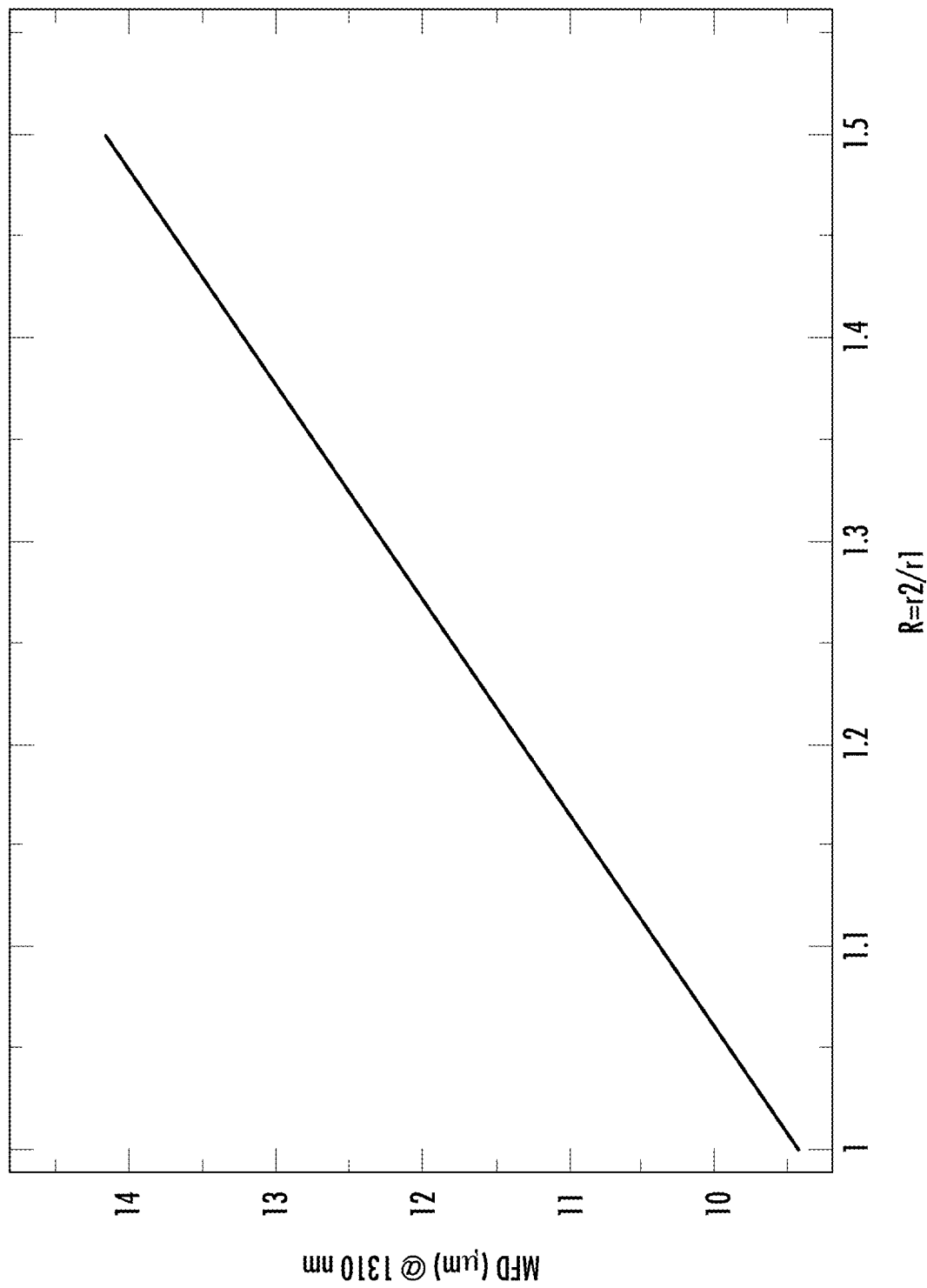
FIG. 5D is a plot of the MFD (microns, μm) at a wavelength of 1310 nm versus the normalized radius R, which divides the expanded core radius r2 by the nominal core radius r1.

FIG. 5D is a plot of the MFD (µm) at 1310 nm versus the normalized radius R=r2/r1. The plot of FIG. 5D shows the change in the MFD with the normalized radius R of the expanded core 18'.

Simulations of the Coupling Efficiency

Simulations of the coupling efficiency were performed based on the configuration of FIG. 4D, wherein the PIC substrate 202 was taken to be silicon and the PIC waveguide 210 was taken to be formed from silicon nitride ($Si_3N_4$) deposited on top surface 204 of the PIC substrate. The PIC waveguide 210 had a thickness of 220 nm and a tapered width WT with a narrow end of 300 nm and a wide end of 500 nm to achieve a match of the propagation constants as described above. An eigenmode expansion method was used to compute the coupling efficiency by calculating the optical power transfer between the D-shaped fiber 10 and the PIC waveguide 210.

Figure 6:
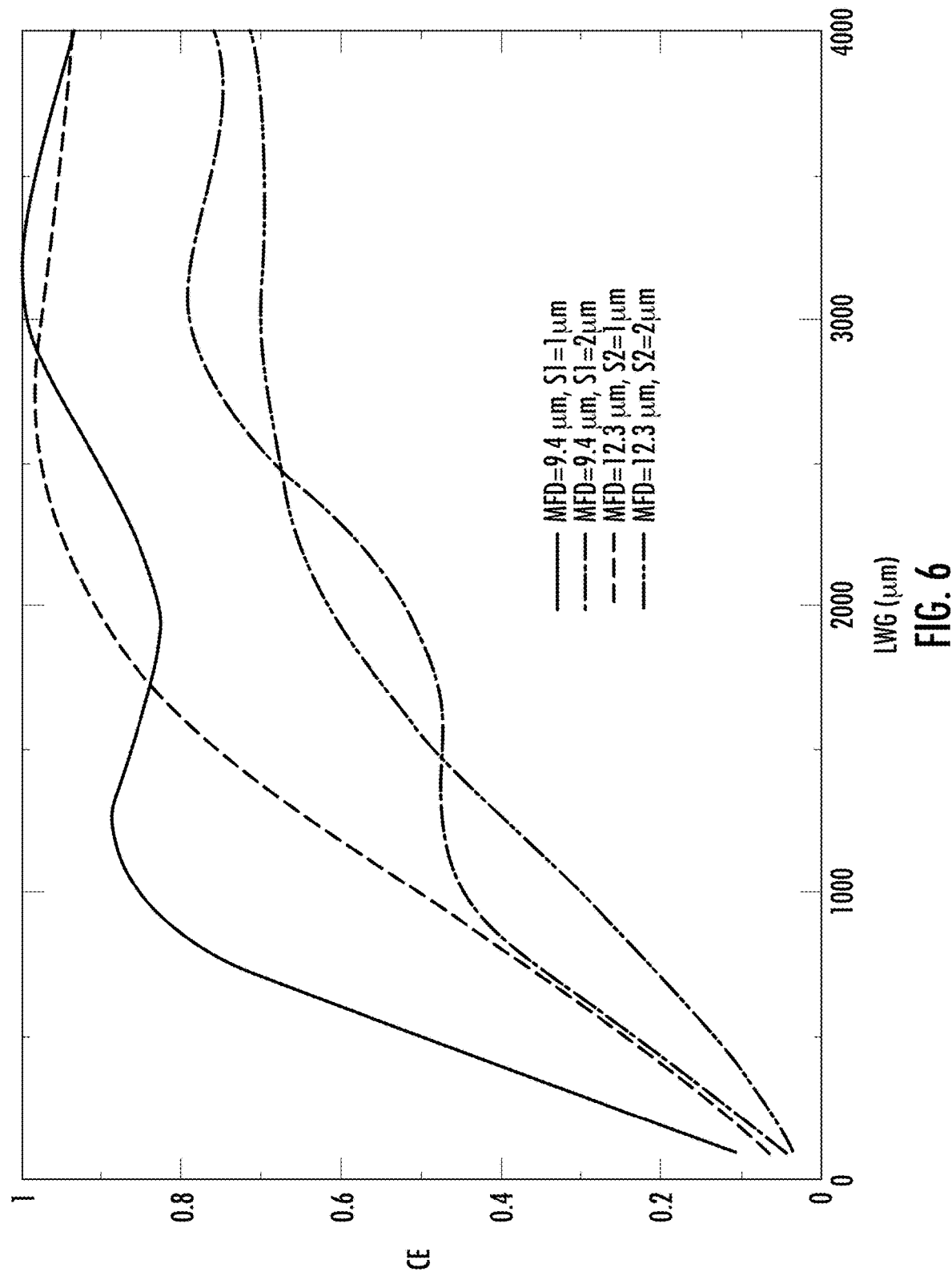
FIG. 6 is a plot of the coupling efficiency CE versus the waveguide axial length LWG (microns, μm) for examples of the D-shaped fiber having a nominal core diameter of 9.4 μm and core spacings S1 of 1 μm and 2 μm, and for an expanded core diameter of 12.3 μm and core spacings S2 of 1 μm and 2 μm.

FIG. 6 is a plot of the evanescent coupling efficiency CE versus the axial length LWG (µm) of the PIC waveguide 210 for the given taper from 300 nm to 500 nm. The coupling efficiency CE of the D-shaped fiber with a core 18 with an MFD=9.4 µm and a core spacing of S1=2 µm is seen to be substantially lower than that of a D-shaped fiber with an expanded core 18' with an MFD=12.3 µm and with a core spacing of S2=1 µm. For a given coupling efficiency CE, the expanded core 18' requires a shorter axial length LWG as compared to a D-shaped fiber with standard core 18 and the larger core spacing S1. Thus, an expanded core 18' localized at the end section 12 end of the D-shaped fiber 10, with adiabatic transition region ATR to the size of the smaller core 18 that defines a larger core spacing S1, can provide an improved coupling efficiency CE at both ends of the D-shaped fiber, i.e., to the SMF 110 at the distal end 13*d* (FIG. 4A) and to the PIC waveguide 210 of the PIC 200 at the end section 12 (FIG. 4B).

Forming the D-Shaped Fiber

Figure 7:
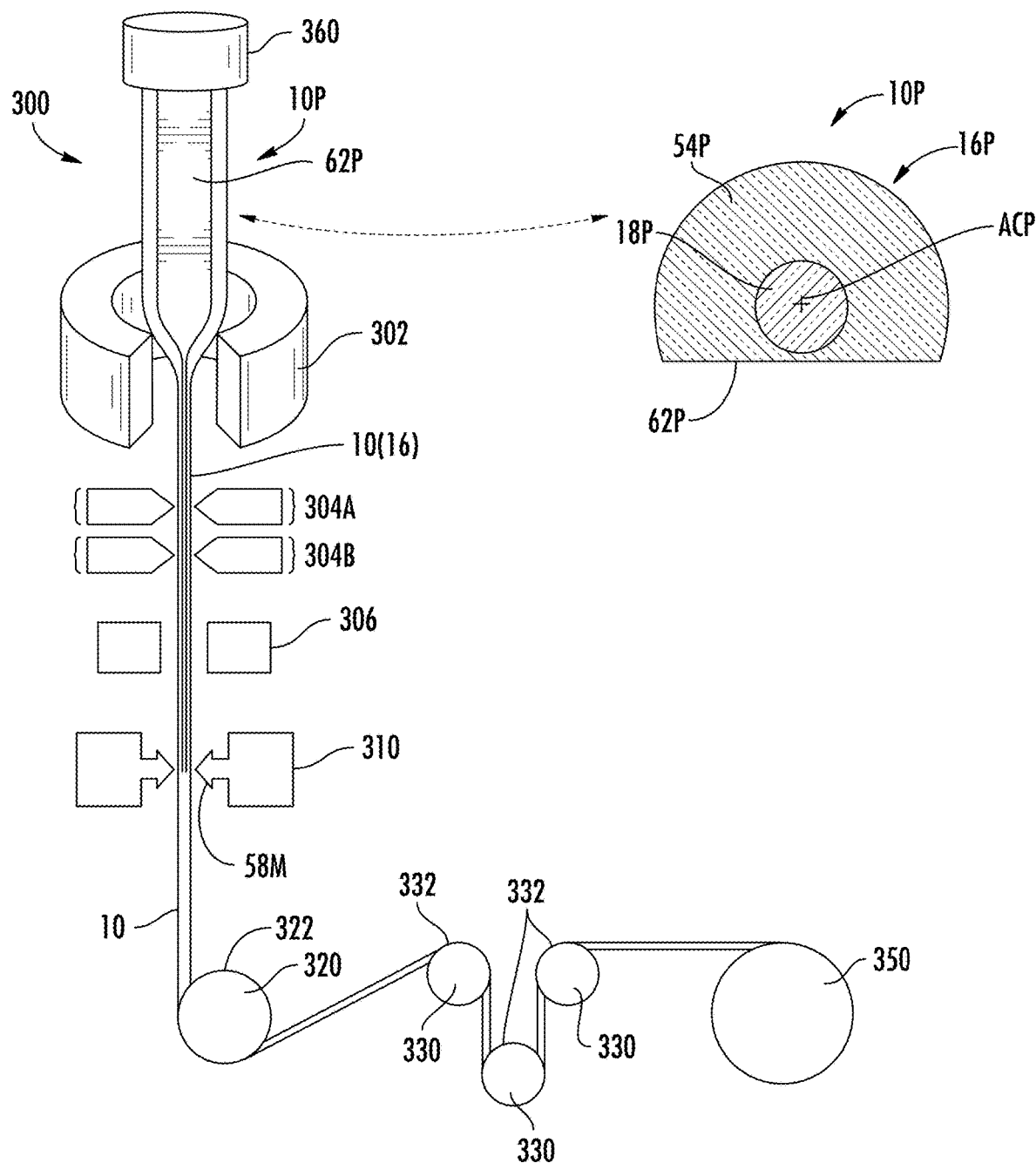
FIG. 7 is a schematic diagram of an example drawing system for forming the D-shaped optical fiber used to form the expanded core for D-shaped fiber as disclosed herein.

The D-shaped fiber 10 can be made using standard optical fiber fabrication drawing techniques. FIG. 7 is a schematic diagram of an example optical fiber drawing system ("drawing system") 300. The drawing system 300 may comprise a draw furnace 302 for heating a D-shaped glass preform ("glass preform") 10P to the glass melt temperature (e.g., to about 200° C.), non-contact measurement sensors 304A and 304B for measuring the size of the drawn D-shaped fiber as it exits the draw furnace for size (diameter) control, a cooling station 306 to cool the drawn D-shaped fiber, a tensioner 320 with a surface 322 to pull (draw) the D-shaped fiber, guide wheels 330 with respective surfaces 332 to guide the drawn D-shaped fiber, and a fiber take-up spool ("spool") 350 to store the drawn D-shaped fiber.

The drawing system 300 also includes a preform holder 360 located adjacent the top side of the draw furnace 302 and that holds the glass preform 10P. The close-up inset of FIG. 7 shows a cross-sectional view an example of the glass preform 10P. The glass preform 10P has a preform core 18P centered on a preform central axis ACP, and a preform glass inner cladding 54 that immediately surrounds the preform core 18P and that includes a preform flat glass-portion surface 62P. The preform glass core 18P and the preform glass inner cladding 54 can be said to define a preform glass portion 16P, which corresponds to the glass portion 16 of the D-shaped fiber 10.

The glass preform 10P has generally the same relative configuration as the D-shaped fiber 10 but is much larger, e.g., 25X to 100X larger. To make the D-shaped glass preform 10P, a circular glass preform is made first. The round shaped glass preform can be made using standard preform fabrication processes, such as by a chemical vapor deposition process, e.g., via outside vapor deposition process (OVD). The preform core 18P can be made by doping silica with an index-increasing core dopant such as discussed above. After the circular glass preform is made, part of the cladding is removed mechanically to form the D-shaped glass preform 10P.

After the glass preform 10P is formed, it is operably supported in the preform holder 360 and relative to the draw furnace 302. One end of the glass preform 10P is then heated by the draw furnace 302 and drawn into the glass portion 16 of the D-shaped fiber 10 using the drawing system 300.

In the fabrication process, the drawn glass preform 10P exits the draw furnace 302, with tension applied by the tensioner 320. The dimensions (e.g., the diameter) of the glass portion 16 of D-shaped fiber 10 are measured by the non-contact sensors 304A and 304B and the measured dimensions are used to control the draw process. The D-shaped fiber 10 can then pass through the cooling mechanism 306, which can be filled with a gas that facilitates cooling at a rate slower than air at ambient temperatures. At this point, the D-shaped fiber 10 consists only of the glass portion 16.

The D-shaped fiber 10 then passes through a coating device 310 that deposits a polymeric material 58M that forms the polymeric outer cladding 58 of the D-shaped fiber.

The D-shaped fiber 10 then passes from the tensioner 320 to the guide wheels 330 and then to the spool 350, where the D-shaped fiber is taken up and stored. The D-shaped fiber 10 as taken up by the spool 350 has the cross-sectional profile as shown in FIG. 1B.

The configuration of the glass preform 10P and the various drawing parameters (draw speed, temperature, tension, cooling rate, etc.) dictate the final form of the D-shaped fiber 10. Notable in the above process is that the glass preform 10P is D-shaped so that the flat glass-portion surface 62 of the D-shaped fiber is formed during the drawing process and corresponds to the preform flat glass-portion surface 62P. This obviates the need for a polishing step performed on the D-shaped fiber 10 to form the flat glass-portion surface 62 in the glass inner cladding 54. The flat glass-portion surface 62 runs along the length of the D-shaped fiber 10, and the core 18 is brought closer to this flat surface by the core expansion process described above.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of establishing an evanescent optical coupling interface between an optical waveguide of a photonic integrated circuit (PIC) and an optical fiber with a glass core having a core dopant and a core outer surface, and a glass cladding immediately surrounding the core and having a flat glass-portion surface closest to the core outer surface at a first core spacing S1, the method comprising:
   applying heat to a section of the optical fiber to cause the glass core to expand toward the flat glass-portion surface due to thermal diffusion of the core dopant;
   terminating the applying of heat to define the expanded core in the heated section of the optical fiber, the expanded core defining an evanescent coupling region having a second core spacing $0 \leq S2 < S1$ and an adiabatic transition region between the core and the evanescent coupling region of the expanded core and
   after terminating the applying of heat, interfacing the flat glass-portion surface adjacent the evanescent coupling region with the optical waveguide to form the evanescent optical coupling interface between the optical fiber and the optical waveguide.

2. The method according to claim 1, wherein the core dopant comprises chlorine.

3. The method according to claim 1, wherein the first core spacing S1 is in the range 2 µm≤S1≤4 µm and wherein the second core spacing S2 is in the range 0 µm≤S2≤4 µm, subject to the condition S2≤(0.9)·S1.

4. The method according to claim 1, wherein the applying of the heat to the section of the optical fiber is performed through the flat glass-portion surface.

5. The method according to claim 1, wherein the applying of the heat to the section of the optical fiber is performed substantially evenly around the section of the optical fiber.

6. The method according to claim 1, wherein the section of the optical fiber comprises an end section of the optical fiber.

7. The method according to claim 1, wherein the evanescent coupling region has an axial length LR in the range 0.5 mm≤LR≤5 mm.

8. The method according to claim 1, wherein the adiabatic transition region has an axial length LT in the range 0.1 mm≤LT≤10 mm.

9. The method according to claim 1, further comprising forming the optical fiber using a fiber drawing process with a preform that includes a preform flat glass-portion surface that defines the flat glass-surface portion of the optical fiber.

10. The method according to claim 1, wherein S2≤(0.8)·S1.

11. A method of establishing an evanescent optical coupling interface between an optical waveguide of a photonic integrated circuit (PIC) and an optical fiber with a glass core and having a core dopant and a core outer surface, and a glass cladding immediately surrounding the glass core and having a flat glass-portion surface closest to the core outer surface at a first core spacing S1, the method comprising:
   heating the glass core at an end section of the optical fiber to cause core dopants in the core to diffuse toward the flat glass-portion surface to form an expanded core comprising an evanescent coupling region having a substantially constant diameter and an adiabatic transition region of varying diameter between the core and the evanescent coupling region;
   terminating the heating to define at the evanescent coupling region a second core spacing S2, wherein $0 \leq S2 \leq (0.9) \cdot S1$ and
   after terminating the applying of heat, interfacing the flat glass-portion surface adjacent the evanescent coupling region with the optical waveguide to form the evanescent optical coupling interface between the optical fiber and the optical waveguide.

12. The method according to claim 11, wherein the core dopant comprises chlorine.

13. The method according to claim 11, wherein $0 \leq S2 \leq (0.8) \cdot S1$.

14. The method according to claim 11, wherein the heating of the glass core comprises applying heat to the optical fiber through the flat glass-portion surface.

15. The method according to claim 11, wherein the heating of the glass core comprises applying heat in a substantially even distribution around the end section of the optical fiber.

16. The method according to claim 11, wherein the heating of the glass core comprises irradiating the glass core with a laser beam.

17. The method according to claim 11, wherein the evanescent coupling region has an axial length LR in the range 0.5 mm≤LR≤5 mm, and wherein the adiabatic transition region has an axial length LT in the range 0.1 mm≤LT≤10 mm.

18. The method according to claim 17, wherein 2 µm≤S1≤4 µm and wherein the second core spacing S2 is in the range 0≤S2≤4 µm, subject to said condition that $0 \leq S2 \leq (0.9) \cdot S1$.

19. The method according to claim 11, further comprising: interfacing the flat glass-portion surface adjacent the expanded core with an optical waveguide to define an evanescent coupling interface.

20. The method according to claim 19, wherein the optical waveguide has an axial taper.

21. The method according to claim 19, wherein the optical fiber is single mode and has an end remote from the expanded core and wherein the method further comprises end-to-end coupling the end of the optical fiber to another end of another single mode optical fiber.

22. The method according to claim 11, further comprising forming the optical fiber using a fiber drawing process with a preform that includes a preform flat glass-portion surface that defines the flat glass-surface portion of the optical fiber.

23. A method of establishing an evanescent optical coupling interface between an optical waveguide of a photonic integrated circuit (PIC) and an optical fiber with a glass core and having a core dopant and a core outer surface, and a glass cladding immediately surrounding the glass core and having a flat glass-portion surface closest to the core outer surface at a first core spacing S1, the method comprising:
   applying heat to a section of the optical fiber to cause the glass core to expand toward the flat glass-portion surface due to thermal diffusion of the core dopant to form an expanded core having an evanescent coupling region that defines a second core spacing $0 < S2 \leq S1$, wherein the expanded core comprises an adiabatic transition region between the core and the evanescent coupling region of the expanded core;
   interfacing the flat glass-portion surface adjacent the evanescent coupling region with the optical waveguide to form the evanescent optical coupling interface between the optical fiber and the optical waveguide and
   after terminating the applying of heat, interfacing the flat glass-portion surface adjacent the evanescent coupling region with the optical waveguide to form the evanescent optical coupling interface between the optical fiber and the optical waveguide.

24. The method according to claim 23, further comprising performing evanescent optical coupling at the evanescent optical coupling interface by either:
   a) transmitting a fiber guided mode in the optical fiber to the evanescent optical coupling interface; or
   b) transmitting a waveguide guided mode in the optical waveguide to the evanescent optical coupling interface.

25. The method according to claim 23, wherein the optical waveguide includes an axial taper.

26. The method according to claim 23, wherein the section of the optical fiber comprises a first end section of the optical fiber.

27. The method according to claim 26, wherein the optical fiber is single-mode fiber and has an end at a second end section opposite the first end section, and wherein the method further comprises end-to-end coupling the end of the optical fiber to an end of another single-mode optical fiber.

28. The method according to claim 23, further comprising forming the optical fiber using a fiber drawing process with a preform that includes a preform flat glass-portion surface that defines the flat glass-surface portion of the optical fiber.

29. The method according to claim 23, wherein the first core spacing S1 is in the range 2 µm≤S1≤4 µm, and wherein the second core spacing S2 is in the range 0≤S2≤4 µm, subject to the condition S2≤(0.9)·S1.

30. The method according to claim 23, wherein the applying of the heat to the section of the optical fiber is performed only through the flat glass-portion surface.

31. The method according to claim 23, wherein the applying of the heat to the section of the optical fiber is performed substantially evenly around the section of the optical fiber.

32. The method according to claim 23, wherein the section of the optical fiber comprises an end section of the optical fiber.

33. The method according to claim 23, wherein the evanescent coupling region has an axial length LR in the range 0.5 mm≤LR≤5 mm and wherein the adiabatic transition region has an axial length LT in the range 0.1 mm≤LT≤10 mm.

34. The method according to 23, wherein the optical waveguide comprises a D-shaped optical fiber with an expanded core.

* * * * *

UNITED STATES PATENT AND TRADEMARK OFFICE
CERTIFICATE OF CORRECTION

| | |
|---|---|
| PATENT NO. | : 11,275,213 B2 |
| APPLICATION NO. | : 16/176456 |
| DATED | : March 15, 2022 |
| INVENTOR(S) | : Alan Frank Evans et al. |

It is certified that error appears in the above-identified patent and that said Letters Patent is hereby corrected as shown below:

In the Claims

In Column 14, Line 30, in Claim 18, delete "$0\leq$" and insert -- $0<$ --.

In Column 16, Line 20, in Claim 34, delete "to 23," and insert -- to claim 23, --.

Signed and Sealed this
Fourteenth Day of June, 2022

Katherine Kelly Vidal
*Director of the United States Patent and Trademark Office*